United States Patent
Lee

(10) Patent No.: US 9,047,419 B2
(45) Date of Patent: Jun. 2, 2015

(54) SYSTEM ON CHIP AND OPERATING METHOD THEREOF

(75) Inventor: Jaeon Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 894 days.

(21) Appl. No.: 13/093,245

(22) Filed: Apr. 25, 2011

(65) Prior Publication Data

US 2011/0283031 A1   Nov. 17, 2011

(30) Foreign Application Priority Data

May 17, 2010   (KR) .................. 10-2010-0046069

(51) Int. Cl.
G06F 13/00   (2006.01)
G06F 13/42   (2006.01)
G06F 1/00    (2006.01)

(52) U.S. Cl.
CPC ......... G06F 13/4221 (2013.01); *Y02B 60/1228* (2013.01); *Y02B 60/1235* (2013.01)

(58) Field of Classification Search
CPC ... G06F 13/385; G06F 13/4291; G06F 13/40; G06F 13/42; G06F 13/4022; H04L 12/403
USPC ......................................... 710/110; 713/324
See application file for complete search history.

(56) References Cited

U.S. PATENT DOCUMENTS

| | | | |
|---|---|---|---|
| 7,646,499 B2* | 1/2010 | Hayakawa | 358/1.14 |
| 8,234,432 B2* | 7/2012 | Serebrin | 710/268 |
| 8,448,001 B1* | 5/2013 | Zhu et al. | 713/322 |
| 8,516,599 B2* | 8/2013 | Morita | 726/26 |
| 2009/0011794 A1* | 1/2009 | Seo | 455/557 |

FOREIGN PATENT DOCUMENTS

| | | |
|---|---|---|
| KR | 10-0536984 | 12/2005 |
| KR | 10-0641706 | 10/2006 |
| KR | 10-0727975 | 6/2007 |
| KR | 1020080062980 | 7/2008 |

OTHER PUBLICATIONS

English Abstract for Publication No. 102003009204 (for 10-0536984).
English Abstract for Publication No. 1020060039655 (for 10-0641706).
English Abstract for Publication No. 1020070029528 (for 10-0727975).
English Abstract for Publication No. 1020080062980.

* cited by examiner

*Primary Examiner* — Brian Misiura
(74) *Attorney, Agent, or Firm* — F. Chau & Associates, LLC

(57) ABSTRACT

A system on chip comprises a bus electrically connected with a master intellectual property (IP) block, a slave IP block, and a default slave IP block. An IP block control part is configured to generate a control signal for activating or inactivating the slave IP block. When a call signal on the slave IP block is received from the master IP block, the bus is configured to transfer the received call signal to either one of the slave IP block and the default slave IP block according to the received call signal and the control signal.

20 Claims, 6 Drawing Sheets

Fig. 3

| La | 1 |
|----|---|
| Lb | 0 |
| Lc | 1 |
| Ld | 1 |
| Le | 1 |
| Lf | 0 |
| Lg | 0 |

Fig. 4

| La | 1 |
|----|---|
| Lb | 0 |
| Lc | 0 |
| Ld | 1 |
| Le | 0 |
| Lf | 0 |
| Lg | 1 |

SYSTEM ON CHIP AND OPERATING METHOD THEREOF

CROSS-REFERENCE TO RELATED APPLICATIONS

This application claims the benefits, under 35 U.S.C. §119, of Korean Patent Application No. 10-2010-0046069 filed May 17, 2010, the entirety of which is incorporated by reference herein.

BACKGROUND

1. Field of the Invention

The present invention relates to System on Chip (SOC), and more particularly, to an SOC and a method of operating the same.

2. Discussion of the Related Art

System-on-a-chip or system on chip (SoC or SOC) refers to integrating all components of a computer or other electronic system into a single integrated circuit (chip). With convergence of computers, communications, broadcasting, etc., demands for application-specific integrated circuits (ASIC) and application-specific standard products (ASSP) is being replaced by demand for the SOC. Further, demand for information technology equipment having a small-size and light weight is driving the development of SOC-associated industries.

The SOC may include a plurality of components that may be referred to as "Intellectual Properties" (IPs), each of which performs a specific function therein. In general, the intellectual properties are interconnected through a bus. The Advanced High-Performance Bus (AMBA), which is a registered trademark of ARM Ltd., is applied as an exemplary bus standard for interconnecting and managing intellectual properties within the SOC. The AMBA may include Advanced High-performance Bus (AHB), Advanced Peripheral Bus (APB), Advanced eXtensible Interface (AXI), and the like. The interface protocol between the AXI and IPs may include a multiple outstanding address function, a data interleaving function, etc.

As compared with a multi-chip system, the SOC may have reduced power consumption, reduced manufacture cost, and a high degree of reliability. Further, a system using the SOC may cost less to assemble than a system utilizing a plurality of packages.

SUMMARY

One aspect of exemplary embodiments of the present inventive concept is directed to provide a system on chip which includes a bus electrically connected with a master intellectual property (IP) block, a slave IP block, and a default slave IP block. An IP block control part is configured to generate a control signal for activating or inactivating the slave IP block. When a call signal on the slave IP block is received from the master IP block, the bus is configured to transfer the received call signal to either the slave IP block or the default slave IP block according to the received call signal and the control signal.

An aspect of exemplary embodiments of the present inventive concept is directed to provide a system on chip which includes a plurality of IP blocks included in each of a first power domain and a second power domain. A bus electrically connects the plurality of IP blocks and a default slave IP block. A first power domain control part activates the plurality of IP blocks in the first power domain and a second power domain control part generates a control signal for selectively activating the plurality of IP blocks in the second power domain. When a call signal on a slave IP block in the second power domain is received from a master IP block in the first power domain, the bus is configured to transfer the call signal to either one of the slave IP block and the default slave IP block, depending upon the control signal and the call signal.

An aspect of exemplary embodiments of the present inventive concept is directed to provide an operating method of a system on chip which includes a bus connecting a master IP block, a slave IP block, and a default slave IP block. The operating method includes receiving a call signal on the slave IP block from the master IP block. A control signal is received for selectively activating the slave IP block. The call signal is transferred to either the slave IP block or the default slave IP block according to the call signal and the control signal.

BRIEF DESCRIPTION OF THE DRAWINGS

The above and other objects and features will become apparent from the following description with reference to the following figures, wherein like reference numerals may refer to like parts throughout the various figures, and wherein:

FIG. 3 is a table showing logic values of the first to seventh lines of FIG. 2 when the second function block in FIG. 2 is activated;

FIG. 4 is a table showing logic values of the first to seventh lines of FIG. 2 when the second function block in FIG. 2 is inactivated;

DETAILED DESCRIPTION

The inventive concept is described more fully hereinafter with reference to the accompanying drawings, in which exemplary embodiments of the present inventive concept are shown. This inventive concept may, however, be embodied in many different forms and should not be construed as limited to the embodiments set forth herein. Like numbers may refer to like elements throughout the disclosure.

It will be understood that, although the terms first, second, third etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

It will be understood that when an element or layer is referred to as being "on", "connected to", "coupled to", or "adjacent to" another element or layer, it can be directly on, connected, coupled, or adjacent to the other element or layer, or intervening elements or layers may be present.

Figure 1:
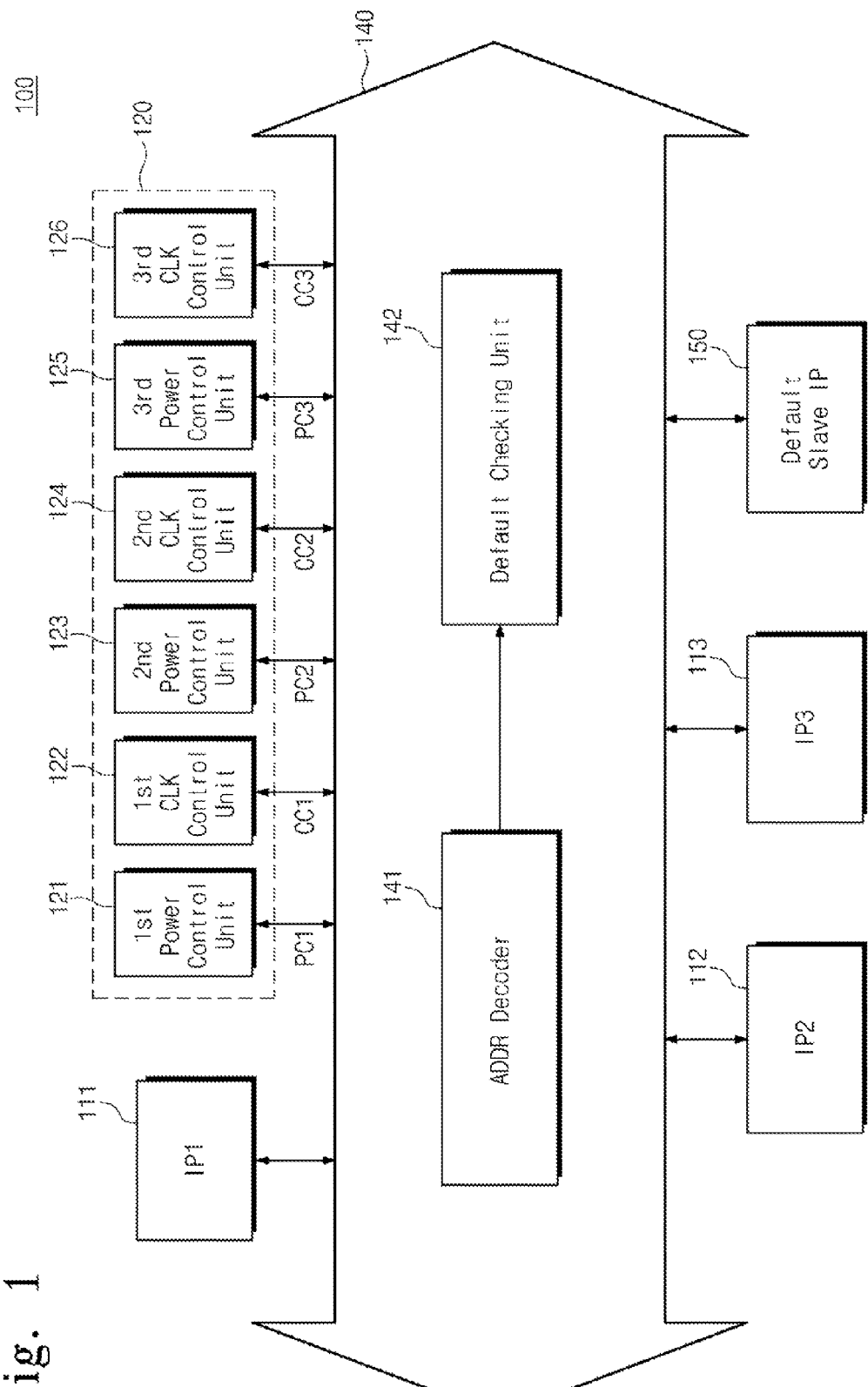
FIG. 1 is a block diagram showing a system on chip according to an exemplary embodiment of the present inventive concept.

FIG. 1 is a block diagram showing a system on chip according to an exemplary embodiment of the present inventive concept.

Referring to FIG. 1, a system on chip (hereinafter, referred to as SOC) 100 includes the first to third Intellectual Property (IP) blocks 111 to 113, a power and clock control part 120, a bus 140, and a default slave IP block 150.

The first to third IP blocks 111 to 113 are electrically connected with the bus 140. In FIG. 1, there is shown an example in which the SOC 100 includes the first to third IP blocks 111 to 113, however, additional IP blocks may be provided in the SOC 100.

Each of the first to third IP blocks 111 to 113 includes an interface (not shown) which is configured to communicate with the bus 140. The first to third IP blocks 111 to 113 are capable of interfacing with the bus 140 using their own interfaces. The first to third IP blocks 111 to 113 are capable of exchanging data one another via the bus 140.

In an exemplary embodiment, an address region including address values may be assigned to each of the first to third IP blocks 111 to 113. For example, an address region ranging from a $1^{st}$ address to an $M^{th}$ address is assigned to the first IP block 111. An address region ranging from a $(M+1)^{th}$ address to a $2M^{th}$ address is assigned to the second IP block 112. An address region ranging from a $(2M+1)^{th}$ address to a $3M^{th}$ address is assigned to the third IP block 113.

In an exemplary embodiment, address regions can be assigned upon designing of the SOC, and the first to third IP blocks 111 to 113 are arranged to the assigned address regions. The first to third IP blocks 111 to 113 are configured to generate a call signal on a specific address region, respectively. A call signal may be sent to an IP block corresponding to the specific address region via the bus 140.

The power and clock control part 120 includes the first to third power control units 121, 123, and 125 and the first to third clock control units 122, 124, and 126. In FIG. 1, there is shown an example in which the power and clock control part 120 includes the first to third power control units 121, 123, and 125, however, the power and clock control part 120 may further include a plurality of power control units. Likewise, the power and clock control part 120 may further include a plurality of clock control units.

The power and clock control part 120 supplies a power and a clock to the first to third IP blocks 111 to 113. Although not shown in FIG. 1, the first to third power control units 121, 123, and 125 supply a power to the first to third IP blocks 111 to 113, respectively. Although not shown in FIG. 1, the first to third clock control units 122, 124, and 126 supply a clock to the first to third IP blocks 111 to 113, respectively. For example, the first to third power control units 121, 123, and 125 directly supply a power to the first to third IP blocks 111 to 113 without passing the bus 140, respectively. For example, the first to third clock control units 122, 124, and 126 directly supply a clock to the first to third IP blocks 111 to 113 without passing the bus 140, respectively.

The power and clock control part 120 generates control signals for activating or inactivating the first to third IP blocks 111 to 113. The first to third IP blocks 111 to 113 are selectively supplied with a power and a clock according to the control signals. For example, the control signals generated by the power and clock control part 120 include the first to third power control signals PC1 to PC3 and the first to third clock control signals CC1 to CC3.

The first to third power control units 121, 123, and 125 correspond to the first to third IP blocks 111, 112, and 113, respectively. The first to third power control units 121, 123, and 125 generate the first to third power control signals PC1 to PC3, respectively.

Each of the first to third power control signals PC1 to PC3 is capable of being defined as an active power control signal or a sleep power control signal. Activation and inactivation of each of the first to third IP blocks 111 to 113 may be made according to corresponding control signals. For example, activation and inactivation of each of the first to third IP blocks 111 to 113 may be made according to whether a corresponding control signal is an active power control signal (activation) or a sleep power control signal (inactive). For example, the first power control unit 121 generates the first power control signal PC1 as an active power control signal, and the first IP block 111 is powered.

In an exemplary embodiment, the first to third power control units 121, 123, and 125 may generate corresponding active power control signals to power the first to third IP blocks 111 to 113, respectively. For example, an active power control signal may correspond to a logic value '0'. The first to third power control units 121, 123, and 125 may generate corresponding sleep power control signals to interrupt power to the first to third IP blocks 111 to 113, respectively. For example, a sleep power control signal may correspond to a logic value '1'.

The first to third clock control units 122, 124, and 126 may correspond to the first to third IP blocks 111 to 113, respectively. The first to third clock control units 122, 124, and 126 generate the first to third clock control signals CC1 to CC3, respectively.

Each of the first to third clock control signals CC1 to CC3 is capable of being defined as an active clock control signal or a sleep clock control signal. Activation and inactivation of each of the first to third IP blocks 111 to 113 may be made according to corresponding control signals. For example, activation and inactivation of each of the first to third IP blocks 111 to 113 may be made according to whether a corresponding clock signal is an active clock control signal (activation) or a sleep clock control signal (inactive). For example, the first clock control unit 122 generates the first clock control signal CC1 as an active clock control signal, and the first IP block 111 is supplied with the first clock control signal CC1 being an active clock control signal.

In an exemplary embodiment, the first to third clock control units 122, 124, and 126 may generate corresponding active clock control signals to supply a clock to the first to third IP blocks 111 to 113, respectively. The first to third clock control units 122, 124, and 126 may generate corresponding sleep clock control signals to prevent a clock from being supplied to the first to third IP blocks 111 to 113. For example, an active clock control signal may correspond to a logic value '0' and a sleep clock control signal may correspond to a logic value '1'.

In the event that either one of a power and a clock is not supplied to an IP block, the IP block is inactivated. For example, if either one of a power and a clock is not supplied to the second IP block 112, the IP block 112 is inactivated. When a power is not supplied to the second IP block 112, the IP block 112 is inactivated. When a clock is not supplied to the second IP block 112, the IP block 112 is inactivated. On the other hand, if both a power and a clock are supplied to an IP block, the IP block is activated.

The bus 140 is electrically connected with the first to third IP blocks 111 to 113, the power and clock control part 120, and the default slave IP block 150. The bus 140 may provide a data communication function among the first to third IP blocks 111 to 113.

Each of the first to third IP blocks 111 to 113 generates call signals to call IP blocks in the SOC 100. For example, the first IP block 111 may send a call signal (not shown) on the second IP block 112 to the bus 140. The bus 140 transfers a call signal received from the first IP block 111 into the second IP block 112. Call signals on the second and third IP blocks 112 and 113 are sent to the bus 140 from the first IP block 111. The bus 140 is capable of sending the received call signals to the second and third IP blocks 112 and 113.

An IP block receiving a call signal may send an answer signal (not shown) to the bus 140. The bus 140 sends the received answer signal to an IP block which generates the call signal.

Hereinafter, an IP block for generating a call signal is defined as a master IP block, and an IP block under call is defined as a slave IP block. The bus 140 may send the received answer signal to a master IP block. For example, a call signal generated by a master IP block is sent to a slave IP block via the bus 140. After generating of a call signal, a master IP block enters a standby mode to wait for an answer signal. An answer signal generated by a slave IP block is sent to a master IP block via the bus 140.

The bus 140 includes an address decoder 141 and a default checking unit 142. The address decoder 141 is configured to decode address information included in a call signal. Address information in a call signal may be an address for designating a slave IP block. In FIG. 1, there is illustrated an example in which the address decoder 141 and the default checking unit 142 are included in the bus 140. The address decoder 141 and the default checking unit 142 are electrically connected with the bus 140 as an independent element from the bus 140. Although the address decoder 141 and the default checking unit 142 are electrically connected with the bus 140 as an independent element from the bus 140, functions of the elements 140, 141, and 142 are identical to those in FIG. 1.

According to exemplary embodiments of the present inventive concept, the default checking unit 142 receives decoded address information from the address decoder 141. Further, the default checking unit 142 receives control signals from the power and clock control part 120. The default checking unit 142 may transfer the received call signal (or call information included in the call signal) to a slave IP block or the default slave IP block, depending upon the received decoded address information and control signals. In the event that a slave IP block is inactivated, the default checking unit 142 sends the received call signal to the default slave IP block 150 via the bus 140. In the event that a slave IP block is activated, the default checking unit 142 sends the received call signal to the slave IP block via the bus 140.

In particular, the default checking unit 142 may receive the first to third power control signals PC1 to PC3, the first to third clock control signals CC1 to CC3, and the decoded address information. The default checking unit 142 transfers a call signal to either one of a slave IP block and a default slave IP block 150, depending upon the decoded address information and power and clock control signals which correspond to a slave IP block.

In an exemplary embodiment, it is assumed that a call signal on the second IP block 112 is produced from the first IP block 111. The address decoder 141 may decode address information included in a received call signal. The address information included in the call signal may correspond to an address of the second IP block 112. The default checking unit 142 may receive the first to third power control signals PC1 to PC3, the first to third clock control signals CC1 to CC3, and the decoded address information. The default checking unit 142 transfers a call signal to either one of the second IP block 112 and the default slave IP block 150, depending upon the decoded address information and power and clock control signals PC2 and CC2.

In an exemplary embodiment, in the event that at least one of the second power and clock control signals PC2 and CC2 is a control signal for inactivating the second IP block 112, the default checking unit 142 sends the call signal to the default slave IP block 150. For example, if the second power control signal PC2 is a sleep power control signal or the second clock control signal CC2 is a sleep clock control signal, the default checking unit 142 transfers a call signal to the default slave IP block 150. On the other hand, in the event that at least one of the second power and clock control signals PC2 and CC2 is a control signal for activating the second IP block 112, the default checking unit 142 sends the call signal to the second IP block 112.

The default slave IP block 150 is electrically connected with the bus 140. The default slave IP block 150 is configured to generate an answer signal in response to a call signal. The call signal is generated from a master IP block, and the default slave IP block 150 may receive the call signal via the bus 140. The master IP block may be one of the first to third IP blocks 111 to 113 which are included in the SOC 100.

In an exemplary embodiment, in a case where address information included in a call signal does not correspond to any one of the first to third IP blocks 111 to 113, the bus 140 can send the call signal to the default slave IP block 150. For example, when a slave IP block to be called is at an inactive state, the bus 140 sends the call signal to the default slave IP block 150 using the default checking unit 142. An answer signal generated from the default checking unit 142 is transferred to a master IP block via the bus 140. Accordingly, the default checking unit 142 may judge whether slave IP blocks are in an inactive state, based upon power and clock control signals of the slave IP blocks. Further, the default checking unit 142 may detect whether a slave IP block to be called is inactivated or activated, based upon the judgment result. If a slave IP block to be called is judged to be inactive, the default checking unit 142 switches the call signal to the default slave IP block 150. On the other hand, if a slave IP block to be called is judged to be active, the default checking unit 142 sends the call signal to the slave IP block. As a result, a master IP block receives an answer signal on a call signal regardless of whether a slave IP block to be called is activated or inactivated.

In an exemplary embodiment, the power and clock control part 120 may constitute an IP block control part for controlling an activation or inactivation of the IP blocks 111, 112, and 113.

Figure 2:
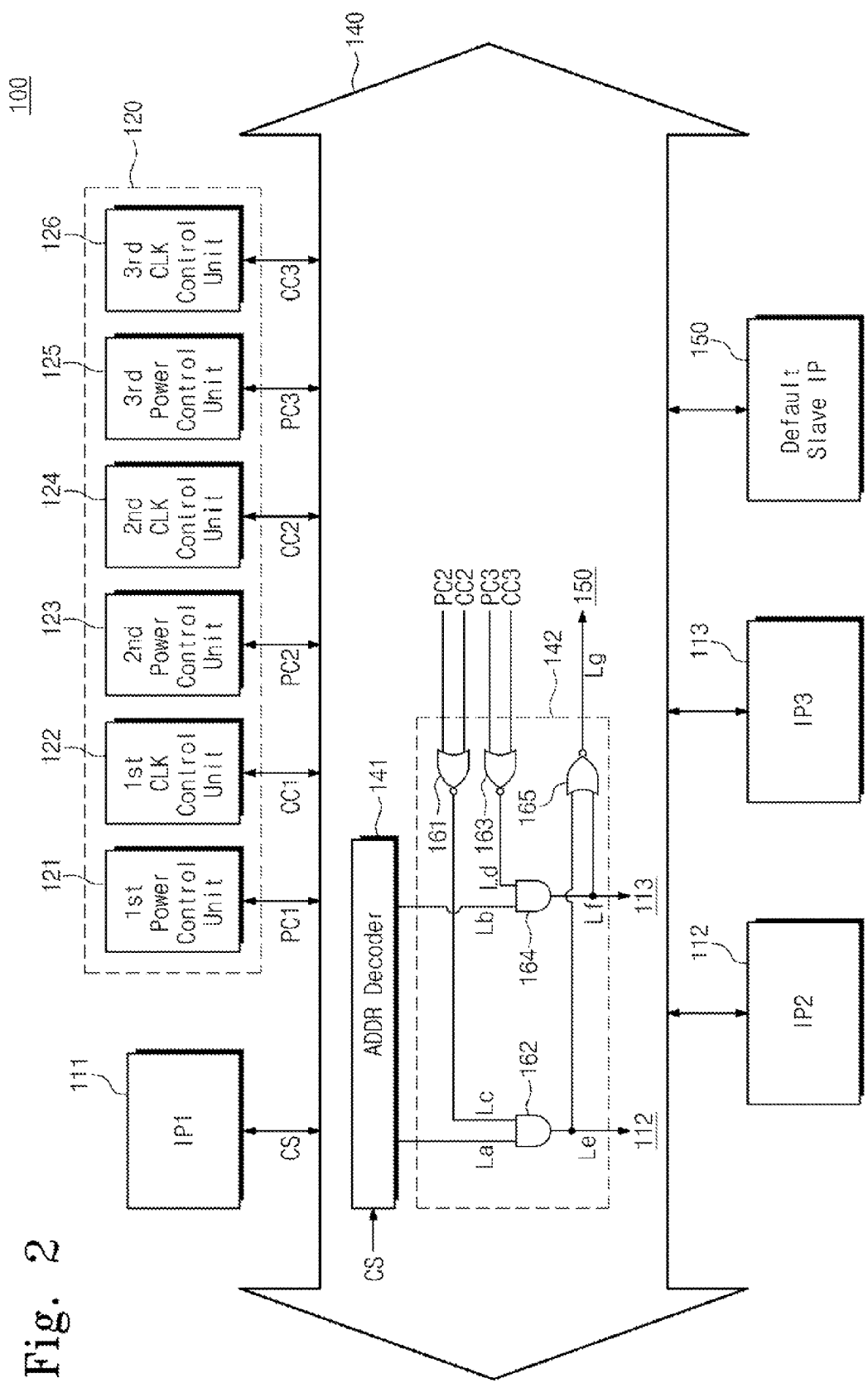
FIG. 2 is a block diagram showing a system on chip including a default checking unit according to an exemplary embodiment of the present inventive concept.

FIG. 2 is a block diagram showing a system on chip including a default checking unit according to an exemplary embodiment of the inventive concept. In FIG. 2, there is illustrated the case that the first IP block 111 generates a call signal.

Referring to FIG. 2, SOC 100 includes the first IP blocks 111 to 113, a power and clock control part 120, a bus 140, and a default slave IP block 150.

The first IP blocks 111 to 113 are configured to operate in the same way as described above with respect to FIG. 1. The power and clock control part 120 includes the first to third power control units 121, 123, and 125, and the first to third clock control units 122, 124, and 126. The power and clock control part 120 is configured to operate in the same way as described above with respect to FIG. 1.

The bus 140 includes an address decoder 141 and a default checking unit 142. The address decoder 141 is configured to operate the same as described in FIG. 1. The address decoder 141 decodes address information included in a call signal.

In FIG. 2, a call signal CS is transferred to the bus 140 from the first IP block 111. The address decoder 141 may decode address information included in the call signal CS. If the bus 140 is provided with a call signal CS on the second IP block 112, the address decoder 141 decodes address information included in the call signal CS to select the first line La. For example, the address decoder 141 selects the first line La by setting the first line La to a logic value '1' and the second line Lb to a logic value '0'. As an example, when a call signal CS on the third IP block 113 is provided to the bus 140, the address decoder 141 selects the second line Lb by setting the first line La to a logic value '0' and the second line Lb to a logic value '1'.

The default checking unit 142 receives decoded address information from the address decoder 141 and control signals from the power and clock control part 120. The default checking unit 142 may utilize control signals corresponding to a slave IP block. The default checking unit 142 may send the call signal to a slave IP block or a default slave IP block 150, depending upon the control signals corresponding to the slave IP block. When at least one of control signals corresponding to a slave IP block is a control signal for inactivating the slave IP block, the default checking unit 142 may send a call signal to the default slave IP block 150. On the other hand, when each of control signals corresponding to a slave IP block is a control signal for activating the slave IP block, the default checking unit 142 may send a call signal to the slave IP block.

For the purposes of describing features of the inventive concept, it is assumed that each of the first to third power control signals PC1 to PC3 has a logic value '0' when the first to third IP blocks 111 to 113 are activated and that each of the first to third power control signals PC1 to PC3 has a logic value '1' when the first to third IP blocks 111 to 113 are inactivated. That is, an active power control signal may correspond to a logical value '0', and a sleep power control signal may correspond to a logic value '1'. However, exemplary embodiments of the present inventive concept may easily use opposite logical values for representing activated and inactivated states.

Likewise, it is assumed that each of the first to third clock control signals CC1 to CC3 has a logic value '0' when the first to third IP blocks 111 to 113 are activated and that each of the first to third clock control signals CC1 to CC3 has a logic value '1' when the first to third IP blocks 111 to 113 are inactivated. That is, an active clock control signal may correspond to a logical value '0', and a sleep clock control signal may correspond to a logic value '1'. However, exemplary embodiments of the present inventive concept may easily use opposite logical values for representing activated and inactivated states.

Below, FIGS. 3 and 4 will be described under the assumption that a call signal CS generated from the first FP block 111 is a signal of calling the second IP block 112.

FIG. 3 is a table showing logic values of the first to seventh lines of FIG. 2 when the second function block in FIG. 2 is activated. Referring to FIGS. 2 and 3, a bus 140 receives a call signal CS from the first IP block 111.

An address decoder 141 may decode address information corresponding to the second IP block 112. Accordingly, the first line La is set to a logical value '1', and the second line Lb is set to a logical value '0'.

The first gate 161 logically combines the second power and clock control signals PC2 and CC2. An output Lc of the first gate 161 may be set to a logic value '1' when inputs of the first gate 161 all have a logical value '0' and to a logic value '0' when any one of inputs of the first gate 161 has a logical value '1'.

When the second IP block 112 is activated, the second power control signal PC2 has a logical value '0' and the second clock control signal CC2 has a logical value '0'. Accordingly, an output of the first gate 161, for example, the third line Lc is set to a logical value '1'. As a result, if the second IP block 112 is activated, the third line Lc is set to a logical value '1'.

The third gate 163 logically combines the third power and clock control signals PC3 and CC3. With the assumption that the third IP block 113 is activated, the third power control signal PC3 has a logical value '0' and the third clock control signal CC3 has a logical value '0'. Accordingly, the fourth line Ld is set to a logical value '0'.

As described in FIG. 2, the second gate 162 is connected with the first and third lines La and Lc to logically combine logical values of the first and third lines La and Lc. Since the first and third lines La and Lc are set to a logical value '1', the second gate 162 outputs a logical value '1'. As a result, when the second IP block is activated, the fourth line Le is set to a logical value '1'.

The fourth gate 164 is connected with the second and fourth lines Lb and Ld to logically combine logical values of the second and fourth lines Lb and Ld. Since the second line is set to a logical value '0' and the fourth line Ld is set to a logical value '1', the fourth gate 164 outputs a logical value '0' on the sixth line Lf. Accordingly, when the second IP block 112 is to be called, the third IP block 113 is not selected regardless of whether corresponding control signals PC3 and CC3 to the third IP block 113 is activated or inactivated.

The fifth gate 165 logically combines logical values of the fifth and sixth lines Le and Lf. Since the fifth line Le has a logical value '1' and the sixth line Lf has a logical value '0'. The seventh line Lg is set to a logical value '0'.

As a result, in the event that the second IP block 112 is activated, the fifth line Le is set to a logical value '1', the sixth line Lf to a logical value '0', and the seventh line Lg to a logical value '0'.

The second IP block 112 corresponds to the fifth line Le. When the fifth line Le is set to a logical value '1', the second IP block 112 is supplied with call information (not shown) included in the call signal CS of the first IP block 111 and then generates an answer signal in response thereto.

The default slave IP block 150 corresponds to the seventh line Lg. Although not shown in figures, the seventh line Lg may be connected with an interface of the default slave IP block 150. Since the seventh line Lg is set to a logical value '0', call information included in the call signal CS is not sent to the default slave IP block 150. Accordingly, the default slave IF block 150 does not generate an answer signal.

When a slave IP block to be called is activated, a call signal (or, call information included therein) is transferred to the slave IP block to be called regardless of whether another slave IP block is activated or inactivated. Further, when a slave IP block to be called is inactivated, a call signal (or, call information included therein) is transferred to a default slave IP block 150 to be called regardless of whether another slave IP block is activated or inactivated.

FIG. 4 is a table showing logic values of the first to seventh lines of FIG. 2 when the second function block in FIG. 2 is inactivated.

Referring to FIGS. 2 and 4, a call signal CS is provided to a bus 140 from the first IP block 111 being a master IP block. As described with reference to FIGS. 3 and 4, the first and second lines La and Lb are set to logical values '1' and '0', respectively.

When the second IP block 112 is inactivated, either one of the second power and clock control signals PC2 and CC2 is set to a logical value '1'. Accordingly, the third line Lc has a logical value '0'.

With the assumption that the third IP block 113 is activated, the third power and clock control signals PC3 and CC3 are set to a logical value '0', respectively. Accordingly, the fourth line Ld has a logical value '1'.

The fifth line Le is connected with an output of the second gate 162, which logically combines logical values on the first and third lines La and Lc. Since the first line La has a logical value '1' and the third line Lc has a logical value '0', the fifth line Le is set to a logical value '0'. An output of the fourth gate 164 is connected with the sixth line Lf. Since the second line Lb has a logical value '0' and the fourth line Ld has a logical value '1', the sixth line Lf is set to a logical value '0'.

The seventh line Lg is connected with an output of the fifth gate 165, which logically combines logical values on the fifth and sixth lines Le and Lf. Since the fifth line Le has a logical value '0' and the sixth line Lf has a logical value '0', the seventh line Lg is set to a logical value '1'. As a result, the fifth line Le is set to a logical value '0', the sixth line Lf to a logical value '0', and the seventh line Lg to a logical value '1'.

With the above description, a call signal CS is not sent to the second and third IP block 112 and 113. The seventh line Lg corresponds to the default slave IP block 150. Accordingly, a call signal CS, for example, call information (not shown) included therein may be sent to the default slave IP block 150.

In the event that the second IP block 112 to be called is activated, a call signal is provided to the second IP block 112. On the other hand, when the second IP block 112 to be called is inactivated, a call signal is provided to the default slave IP block 150. An answer signal generated may be transferred to the first IP block 111, being a master IP block, through the bus 140.

In the event that a call signal on the third IP block 113 is generated from the first IP block 111, the default checking unit 142 may operate in a manner similar to that described above with respect to FIGS. 2 to 4.

If the second IP block 112 or the third IP block 113 is a master IP block, the default checking unit 142 may operate in a manner similar to that described above with respect to FIGS. 2 to 4. For example, in a case where the second IP block 112 is a master IP block, the default checking unit 142 may use the first power and clock control signals PC1 and CC1 and the third power and clock control signals PC3 and CC3. In this case, the fifth and sixth lines Le and Lf correspond to the first and third IP blocks 111 and 113, respectively, and the seventh line Lg corresponds to the default slave IP block 150.

Figure 5:
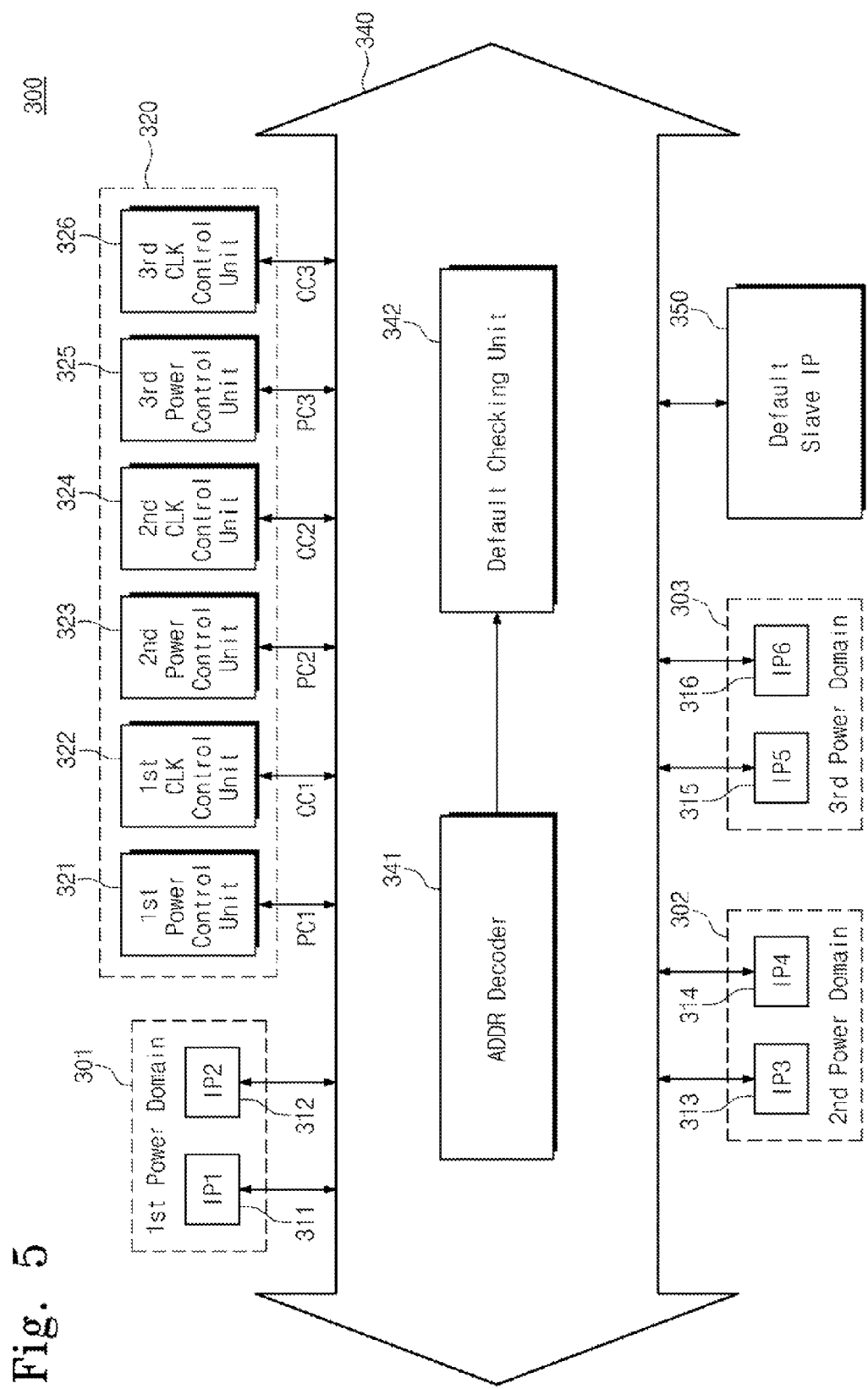
FIG. 5 is a block diagram showing a system on chip according to an exemplary embodiment of the inventive concept.

FIG. 5 is a block diagram showing a system on chip according to an exemplary embodiment of the inventive concept.

Referring to FIG. 5, SOC 300 includes the first to third power domains 301 to 303, a power and clock control part 320, a bus 340, and a default slave IP block 350.

The first power domain 301 comprises the first and second IP blocks 311 and 312. The second power domain 302 comprises the third and fourth IP blocks 313 and 314. The third power domain 303 comprises the sixth and seventh IP blocks 315 and 316. In FIG. 5, there are illustrated only three power domains 301 to 303. However, the SOC 300 may comprise additional power domains. In FIG. 5, there is shown an example that each of the first to third power domains 301 to 303 is formed of two IP blocks. However, each of the first to third power domains 301 to 303 may include additional IP blocks.

The first to third power domains 301 to 303 are supplied with a power and a clock from the power and clock control part 320. When each of the first to third power domains 301 to 303 is supplied with a power and a clock, IP blocks in each of the first to third power domains 301 to 303 may be activated. For example, when the first power domain 301 is supplied with a power and a clock, the first and second IP blocks 311 and 312 in the first power domain 301 are activated.

IP blocks in the SOC 300 may operate in a manner similar to that described above with respect to FIG. 1. For example, each of the first to sixth IP blocks 311 to 316 includes an interface (not shown) and is connected with the bus 340. The first to sixth IP blocks 311 to 316 exchange data with one another through the bus 340.

The power and clock control part 320 may operate in a manner similar to that described above with respect to FIG. 1 except that the first to third power domains 301 to 303 are activated or inactivated. The power and clock control part 320 provides a power and a clock to the first to third power domains 301 to 303.

The first to third power control units 321, 323, and 325 may provide power to the first to third power domains 301 to 303 independently and respectively. The first to third clock control units 322, 324, and 326 may provide a clock to the first to third power domains 301 to 303 independently and respectively.

The power and clock control part 320 includes the first to third power control units 321, 323, and 325 and the first to third clock control units 322, 324, and 326. The first to third power control units 321, 323, and 325 generate the first to third power control signals PC1, PC2, and PC3, respectively. The first to third clock control units 322, 324, and 326 generate the first to third clock control signals CC1, CC2, and CC3, respectively. The power and clock control part 320 may generate control signals for activating or inactivating the first to third power domains 301 to 303. For example, supplying of a power and a clock to the first to third power domains 301 to 303 may be conducted or interrupted according to control signals generated by the power and clock control part 320. Control signals generated by the power and clock control part 320 may include the first to third power control signals PC1 to PC3 and the first to third clock control signals CC1 to CC3.

In FIG. 5, there is shown an example in which the power and clock control part 320 includes three power control units 321, 323, and 325. Likewise, there is shown an example in which the power and clock control part 320 includes three clock control units 322, 324, and 326. However, the power and clock control part 320 may include additional power and clock control units. Control signals may include the first to third power control signals PC1 to PC3 and the first to third clock control signals CC1 to CC3.

As described with reference to FIG. 1, each power control signal can be defined as an active power control signal or a sleep power control signal. When the power and clock control part 320 generates an active power control signal, a power is supplied to a power domain corresponding to the active power control signal. On the other hand, when the power and clock control part 320 generates a sleep power control signal, a power is not supplied to a power domain corresponding to the sleep power control signal.

Each clock control signal can be defined as an active clock control signal or a sleep clock control signal. When the power and clock control part 320 generates an active clock control signal, a clock is supplied to a power domain corresponding to the active clock control signal. On the other hand, when the power and clock control part 320 generates a sleep clock control signal, a clock is not supplied to a power domain corresponding to the sleep clock control signal.

The bus 340 includes an address decoder 341 and a default checking unit 342. The address decoder 341 may operate in a manner similar to that described above with respect to FIG. 1. For example, a call signal is sent to the bus 340 from a master IP block, and the address decoder 341 decodes address information included in the call signal.

The default checking unit 342 receives the first to third power control signals PC1 to PC3 and the first to third clock control signals CC1 to CC3 from the power and clock control part 320. The default checking unit 342 sends the call signal to a slave IP block or a default slave IP block, depending upon decoded address information and control signals indicating activation or inactivation of a power domain including the slave IP block.

It is assumed that a call signal on the fourth IP block 314 is provided to the bus 340 from the first IP block 311. The address decoder 341 decodes address information included in the call signal. The address information may correspond to the fourth IP block 314. The decoded address information is sent to the default checking unit 342. The default checking unit 342 utilizes the second power and clock control signals PC2 and CC2 corresponding to the second power domain 302 which includes the third and fourth IP blocks 313 and 314. The default checking unit 342 sends a call signal to the fourth IP block 314 or the default slave IP block 350, depending upon the decoded address information and the second power and clock control signals PC2 and CC2. For example, if the second power control signal PC2 is an active power control signal and the second clock control signal CC2 is an active clock control signal, a call signal (or call information included in the call signal) may be sent to the fourth IP block 314.

It is assumed that a call signal on the third IP block 313 is provided to the bus 340 from the first IP block 311. The address decoder 341 decodes address information included in the call signal. The address information may correspond to the third IP block 313. The default checking unit 342 sends a call signal to the third IP block 313 or the default slave IP block 350, depending upon the decoded address information and the second power and clock control signals PC2 and CC2. For example, if the second power control signal PC2 is a sleep power control signal and the second clock control signal CC2 is a sleep clock control signal, a call signal (or call information included in the call signal) may be sent to the default slave IP block 350.

The default slave IP block 350 may operate in a manner similar to that described above with respect to FIG. 1. For example, upon receiving of a call signal, the default slave IP block 350 may generate an answer signal, which is sent to a master IP block via the bus 340.

In FIG. 5, there is illustrated an example in which the address decoder 341 and the default checking unit 342 are included in the bus 340. However, the address decoder 341 and the default checking unit 342 are electrically connected with the bus 340 as an independent element from the bus 340. Although the address decoder 341 and the default checking unit 342 are electrically connected with the bus 340 as an independent element from the bus 340, functions of the elements 340, 341, and 342 may be identical to those discussed above with respect to FIG. 5.

In an exemplary embodiment, the power control units 321, 323, and 325 may constitute an element (for example, the first power domain control part) for controlling an activation or inactivation of power domains, and the clock control units 322, 324, and 326 may constitute an element (for example, the second power domain control part) for controlling an activation or inactivation of power domains.

Figure 6:
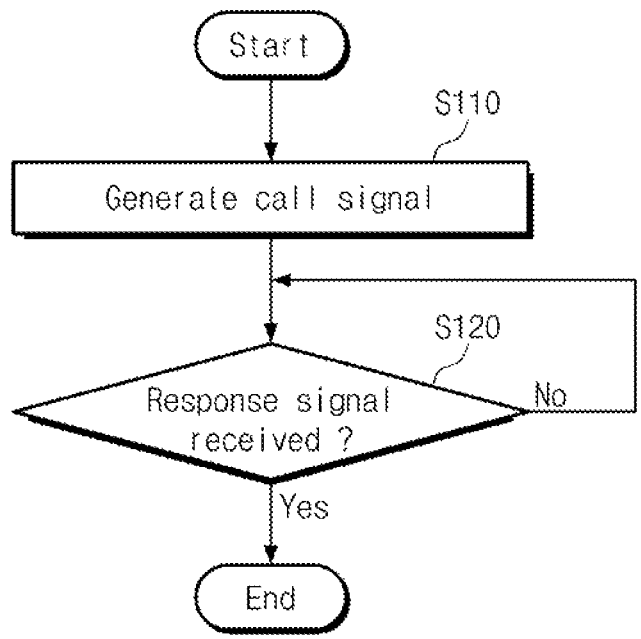
FIG. 6 is a flow chart showing an operating method of a master function block.

FIG. 6 is a flow chart showing an operating method of a master function block according to an exemplary embodiment of the present inventive concept.

Referring to FIGS. 1, 5, and 6, in step S110, a master IP block generates a call signal. After issuing the call signal, the master IP block enters a standby mode to wait for an answer signal from a slave IP block. For example, it is assumed that the first IP block 111/311 generates a call signal on the second IP block 112/312. Afterwards, the first IP block 111/311 may operate in a standby mode until an answer/response signal is received.

In step S120, the master IP block judges whether an answer/response signal is received from a bus 140/340. If the answer/response signal is judged to be received from the bus 140/340, the master IP block completes the standby mode. For example, the master IP block may exchange data with a slave IP block via the bus 140/340.

If the answer/response signal is judged not to be received from the bus 140/340, the master IP block operates in the standby mode. For example, when an answer/response signal is not received, the master IP block operates in the standby mode without performing a next operation.

With exemplary embodiments of the inventive concept, the master IP block may receive an answer/response signal regardless of whether a slave IP block corresponding to a call signal is activated.

Figure 7:
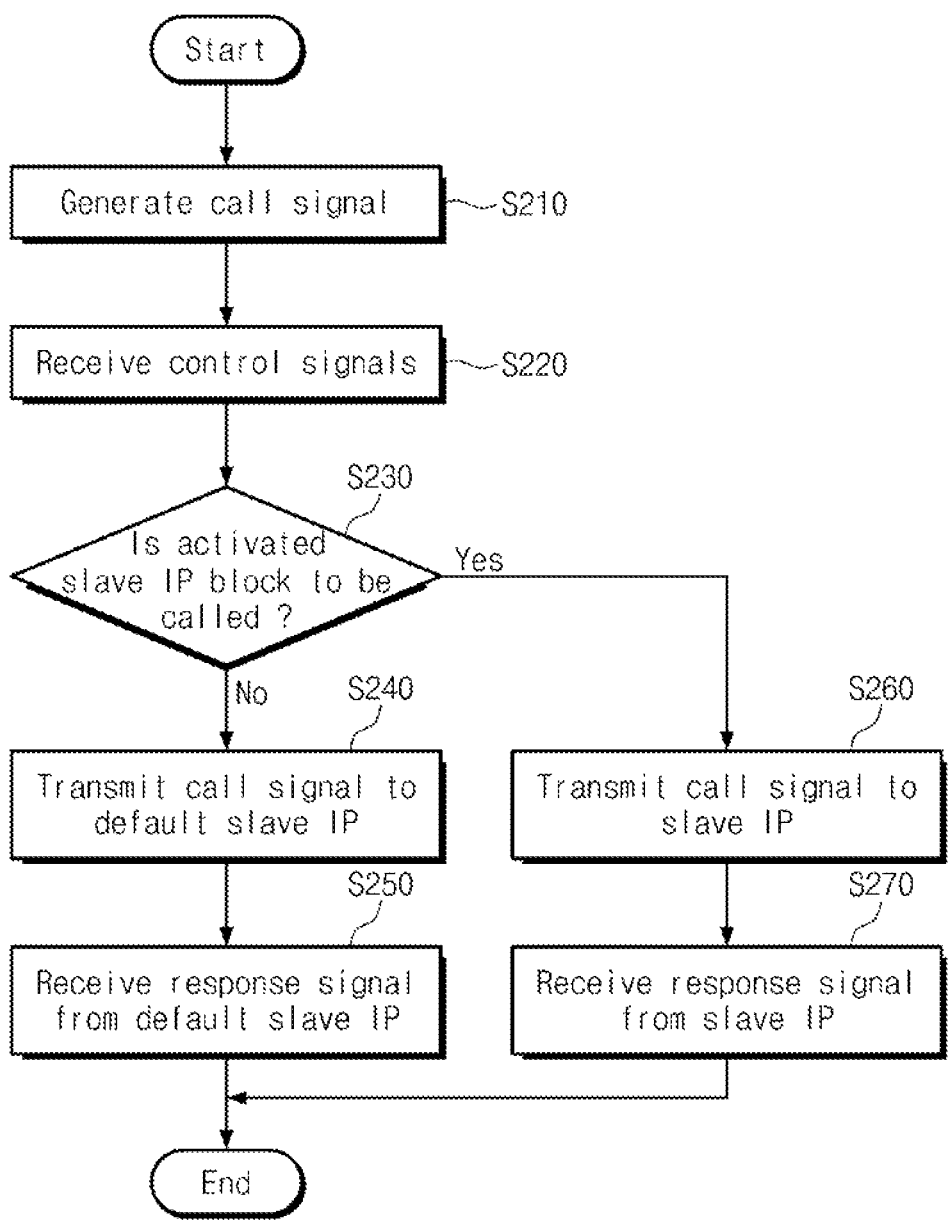
FIG. 7 is a flow chart showing an operating method of a system on chip according to exemplary embodiments of the present inventive concept.

FIG. 7 is a flow chart showing an operating method of a system on chip according to exemplary embodiments of the inventive concept.

Referring to FIGS. 1, 5, and 7, in step S210, a bus 140/340 receives a call signal on a slave IP block from a master IP block. In an exemplary embodiment, the master IP block may include an interface. The master IP block is configured to communicate with the bus 140/340 using an interface of the master IP block.

In step S220, a default checking unit 142/342 receives control signals from the power and clock control part 120/320. The received control signals may include power and clock control signals. As described above, a power control signal is defined as an active power control signal or a sleep power control signal, and a clock control signal is defined as an active clock control signal or a sleep clock control signal.

In step S230, the default checking unit 142/342 judges whether a power and a clock are provided to a slave IP block to be called, depending upon the received control signals. For example, the default checking unit 142/342 judges whether a slave IP block to be called is activated, depending upon the received control signals. Whether the slave IP block to be called is activated is judged according to the received power and clock control signals.

In an exemplary embodiment, if the slave IP block to be called is judged to be inactivated, the procedure goes to step S240, in which the default checking unit 142/342 may sent the call signal (or call information included in the call signal) to a default slave IP block 150/350. The default slave IP block 150/350 generates a response/answer signal (or a default signal) in response to the call signal/information. In step S250, the bus 140/340 receives a response signal (or a default signal) from the default slave IP block 150/350. In an exemplary embodiment, the default slave IP block 150/350 transfers a response/answer signal (or a default signal) to the bus 140/340 using an interface included therein.

On the other hand, if the slave IP block to be called is judged to be activated, the procedure goes to step S260, in which the default checking unit 142/342 transfers the call signal (or call information included in the call signal) to the slave IP block. In step S270, the slave IP block, which is called and activated, provides a response/answer signal to the bus 140/340.

As understood from the above description, the SOC includes a call signal processing method which includes a step of judging whether a slave IP block to be called is activated. When a slave IP block to be called is inactivated, an answer signal corresponding to a call signal on the slave IP block is provided to a master IP block as information indicating that the slave IP block is inactivated. Wherein, the answer signal is generated from a default slave IP block in the SOC. The call signal processing method further comprises, when a slave IP block to be called is activated, providing an answer signal from the slave IP block to be called.

Although not shown in figures, a default checking unit and a default slave IP block are configured to form a default answer signal generating block for providing to a master IP block an answer signal (or a default signal/default answer signal) corresponding to a call signal on the slave IP block as information indicating that the slave IP block is inactivated, when a slave IP block to be called is inactivated.

In an exemplary embodiment, an answer signal (or a default signal) generated by the default slave IP block may be used to inform a master IP block that a slave IP block to be called is inactivated.

With exemplary embodiments of the inventive concept, the bus 140/340 sends a call signal, provided from a master IP block, to a slave IP block or a default slave IP block, based on whether the slave IP block is activated. Accordingly, an answer/response signal is provided to the master IP block, regardless of whether a slave IP block is activated. Accordingly, reliability of the SOC may be increased.

The above-disclosed subject matter is to be considered illustrative, and not restrictive and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A system on chip (SoC) comprising:
    a master intellectual property (IP) configured to generate a call signal including address information;
    a slave IP;
    a default slave IP;
    a power controller configured to generate a power control signal;
    a clock controller configured to generate a clock control signal;
    an address decoder configured to receive the call signal and configured to decode the address information; and
    a default checking circuit configured to generate a first control signal for controlling the slave IP based on the power control signal, the clock control signal and an output of the address decoder, and configured to generate a second control signal for controlling the default slave IP based on the first control signal,
    wherein the slave IP is configured to generate a third signal based on the first control signal, and configured to transfer the third signal to the master IP,
    the default slave IP is configured to generate a fourth signal based on the second control signal, and configured to transfer the fourth signal to the master IP, the fourth signal being generated when the third signal is not generated, the fourth signal being not generated when the third signal is generated, and
    after the master IP transfers the call signal to the address decoder, the master IP is configured to operate in a standby mode until the master IP receives either the third signal or the fourth signal.

2. The SoC of claim 1, wherein the slave IP is configured to generate the third signal when the first control signal has a first value, and
    the slave IP is configured to not generate the third signal when the first control signal has a second value.

3. The SoC of claim 2, wherein the default slave IP is configured to generate the fourth signal when the first control signal has the second value, and
    the default slave IP is configured to not generate the fourth signal when the first control signal has the first value.

4. The SoC of claim 1, wherein the default slave IP is configured to generate the fourth signal when the second control signal has a third value, and
    the default slave IP is configured to not generate the fourth signal when the second control signal has a fourth value.

5. The SoC of claim 1, wherein the default slave IP is configured to generate and transfer the fourth signal to the master IP when the slave IP does not generate the third signal.

6. The SoC of claim 5, wherein the slave IP does not generate the third signal either when the slave IP is inactivated based on the power control signal and the clock control signal, or when the slave IP is not called based on the decoded the address information.

7. The SoC of claim 1, further comprising a bus connecting the master IP, the slave IP, the default slave IP, the power controller, the clock controller, the address decoder, and the default checking circuit.

8. The SoC of claim 7, wherein the bus includes the address decoder.

9. The SoC of claim 1, wherein the power control signal is either an active power control signal or a sleep power control signal, and
    the clock control signal is either an active clock control signal or a sleep clock control signal.

10. A system on chip (SoC) comprising:
    a first power domain including a master intellectual property (IP) configured to generate a call signal, the call signal including address information;
    a second power domain including a slave IP;
    a default slave IP;
    a first power controller configured to generate a first power control signal for controlling the master IP;
    a first clock controller configured to generate a first clock control signal for controlling the master IP;

a second power controller configured to generate a second power control signal for controlling the slave IP;
a second clock controller configured to generate a second clock control signal for controlling the slave IP;
an address decoder configured to receive the call signal and configured to decode the address information; and
a default checking circuit configured to generate a first control signal for controlling the slave IP based on the power control signal, the clock control signal and an output of the address decoder, and configured to generate a second control signal for controlling the default slave IP based on the first control signal,
wherein the slave IP is configured to generate a third signal based on the first control signal, and configured to transfer the third signal to the master IP,
the default slave IP is configured to generate a fourth signal based on the second control signal, and configured to transfer the fourth signal to the master IP, the fourth signal being generated when the third signal is not generated, the fourth signal being not generated when the third signal is generated.

11. The SoC of claim 10, wherein after the master IP transfers the call signal to the address decoder, the master IP is configured to operate in a standby mode until the master IP receives either the third signal or the fourth signal.

12. The SoC of claim 10, wherein the default slave IP is configured to generate and transfer the fourth signal to the master IP either when the slave IP is inactivated, or when the slave IP is not called based on the decoded the address information.

13. The SoC of claim 12, wherein the slave IP is configured to be either activated or inactivated based on the second power control signal and the second clock control signal.

14. A method for operating a system on chip (SoC) including a master IP, a slave IP, a default slave IP, a power controller, a clock controller, a default checking circuit and an address decoder, the method comprising:
generating, by the master IP, a call signal including address information;
receiving, by the address decoder, the call signal from the master IP;
operating the master IP in a standby mode after the master IP transfers the call signal to the address decoder;
decoding, by the address decoder, the address information;
generating, by the power controller, a power control signal;
generating, by the clock controller, a clock control signal;
generating, by the default checking circuit, a first control signal for controlling the slave IP based on the power control signal, the clock control signal and an output of the address decoder;
generate, by the default checking circuit, a second control signal for controlling the default slave IP based on the first control signal;
either generating, by the slave IP, a third signal based on the first control signal, or generating, by the default slave IP, a fourth signal based on the second control signal;
either transferring, by the slave IP, the third signal to the master IP, or transferring, by the default slave IP, the fourth signal to the master IP; and
ending the standby mode of the master IP after the master IP receives either the third signal or the fourth signal,
wherein the fourth signal is generated when the third signal is not generated, and
the fourth signal is not generated when the third signal is generated.

15. A system on chip (SoC) comprising:
a master intellectual property (IP) configured to generate a call signal including address information;
a plurality of slave IPs including a first slave IP and a second slave IP;
a default slave IP;
a power and clock control unit configured to generate a first power control signal, a second power control signal, a first clock control signal and a second clock control signal;
an address decoder configured to receive the call signal and configured to decode the address information; and
a default checking circuit configured to generate a first control signal for controlling the first slave IP based on the first power control signal, the first clock control signal and a first output of the address decoder, configured to generate a second control signal for controlling the second slave IP based on the second power control signal, the second clock control signal and a second output of the address decoder, and configured to generate a third control signal for controlling the default slave IP based on the first control signal and the second control signal,
wherein the first slave IP is configured to generate a first answer signal based on the first control signal, and configured to transfer the first answer signal to the master IP,
the second slave IP is configured to generate a second answer signal based on the second control signal, and configured to transfer the second answer signal to the master IP,
the default slave IP is configured to generate a third answer signal based on the third control signal, and configured to transfer the third answer signal to the master IP, and
the third answer signal is generated when the first answer signal and the second answer signal are not generated.

16. The SoC of claim 15, wherein the second answer signal and the third answer signal are not generated when the first answer signal is generated, and
the first answer signal and the third answer signal are not generated when the second answer signal is generated.

17. The SoC of claim 15, wherein after the master IP transfers the call signal to the address decoder, the master IP is configured to operate in a standby mode until the master IP receives any one among the first answer signal, the second answer signal or the third answer signal.

18. The SoC of claim 15, wherein the default slave IP is configured to generate the third answer signal when the third control signal has a first value, and
the default slave IP is configured to not generate the third answer signal when the third control signal has a second value.

19. The SoC of claim 15, wherein the default slave IP is configured to generate and transfer the third answer signal to the master IP when both the first slave IP and the second slave IP are either inactivated or not called.

20. The SoC of claim 19, wherein the first slave IP is either activated or inactivated based on the first power control signal and the first clock control signal,
the second slave IP is either activated or inactivated based on the second power control signal and the second clock control signal,
the first slave IP is either called or not called based on the decoded the address information, and
the second slave IP is either called or not called based on the decoded the address information.

* * * * *